United States Patent [19]

Sato et al.

[11] Patent Number: 4,459,600

[45] **Date of Patent: * Jul. 10, 1984**

[54] LIQUID JET RECORDING DEVICE

[75] Inventors: Yasushi Sato, Kawasaki; Yasushi Takatori, Machida; Toshitami Hara, Tokyo; Yoshiaki Shirato, Yokohama, all of Japan

[73] Assignee: Canon Kabushiki Kaisha, Tokyo, Japan

[ * ] Notice: The portion of the term of this patent subsequent to May 18, 1999 has been disclaimed.

[21] Appl. No.: 324,991

[22] Filed: Nov. 25, 1981

Related U.S. Application Data

[63] Continuation of Ser. No. 084,748, Oct. 15, 1979, Pat. No. 4,330,787.

[30] Foreign Application Priority Data

| | | | |
|---|---|---|---|
| Oct. 31, 1978 | [JP] | Japan | 53-133887 |
| Oct. 31, 1978 | [JP] | Japan | 53-133888 |
| Oct. 31, 1978 | [JP] | Japan | 53-133889 |
| Dec. 28, 1978 | [JP] | Japan | 53-165843 |

[51] Int. Cl.$^3$ .............................. G01D 15/16

[52] U.S. Cl. .............................. 346/140 R

[58] Field of Search .............................. 346/140 R, 75

[56] References Cited

U.S. PATENT DOCUMENTS

| | | | |
|---|---|---|---|
| 2,556,550 | 6/1951 | Murray | 346/140 R X |
| 3,683,212 | 8/1972 | Zoctan | 346/75 X |
| 3,747,120 | 7/1973 | Stemme | 346/140 R X |
| 3,878,519 | 4/1975 | Eaton | 346/140 R X |
| 3,953,862 | 4/1976 | Amberntsson | 346/140 |
| 4,330,787 | 5/1982 | Sato | 346/140 R |

*Primary Examiner*—Joseph W. Hartary

*Attorney, Agent, or Firm*—Fitzpatrick, Cella, Harper & Scinto

[57] ABSTRACT

A liquid jet recording device comprises: a recording head having liquid discharging orifice for discharging liquid in a predetermined direction, a heat generating member, a heat acting zone where heat energy generated from the heat generating member acts on the liquid, and liquid feeding path for feeding the liquid to the heat acting zone; and drive signal feeding means for generating drive signals to drive said heat generating member to discharge the liquid in the predetermined direction, wherein the direction of the liquid flowing into said heat acting zone from said liquid feeding path differs from the direction of the liquid flowing out of said heat acting zone toward said liquid discharging orifice.

2 Claims, 17 Drawing Figures

LIQUID JET RECORDING DEVICE

This is a continuation of application Ser. No. 84,748, filed Oct. 15, 1979 now U.S. Pat. No. 4,330,787.

BACKGROUND OF THE INVENTION

1. Field of the Invention

This invention relates to a recording device of a type, in which liquid is discharged from a nozzle or nozzles by the action of heat energy. More particularly, the invention is concerned with a recording device of improved liquid discharge efficiency, discharge response, easiness in manufacture, and so forth.

2. Description of the Prior Art

So-called non-impact recording methods have recently drawn public attention in that the noise at the recording could be reduced to a negligible order. Among these particularly important is the so-called ink jet recording method which permits high-speed recording on a plain paper without necessity for particular fixing treatment. In this field, there have been proposed various approaches including those already commercialized and those still under development.

Such ink jet recording, in which droplets of a liquid recording medium, or usually called "ink," are made to spatter and be deposited on a recording member to achieve the recording, can be classified into several processes according to the method of forming the droplets and also to the method of controlling the direction of flight of the droplets.

A process is disclosed, for example, in the U.S. Pat. No. 3,060,429 (Teletype process), in which the liquid droplets are generated by electrostatic pull, and the droplets thus generated on demand are deposited onto a recording member with or without an electric-field control on their flight direction.

More specifically the electric-field control is achieved by applying an electric field betwen the liquid contained in a nozzle having an orifice and an accelerating electrode, thereby causing the liquid to be ejected from the orifice and to spatter between x-y deflecting electrodes which are so arranged as to be capable of controlling electric field in accordance with the recording signals, and thus selectively controlling the direction of flight of droplets according to variations in the strength of electric field to obtain deposition at desired positions.

While this type of recording head is simple in its construction, the system as a whole is not necessarily simple, hence there are various disadvantages inherent in it such that high degree of technique and precision are required of electrical controls in generation and spattering direction of droplets, and further than the multi-orifice arrangement of the recording head, which is indispensable in the high speed recording operation, is difficult.

Another process is disclosed, for example, in the U.S. Pat. No. 3,596,275 (Sweet process) and in the U.S. Pat. No. 3,298,030 (Lewis and Brown process), in which flow of liquid droplets having controlled electrostatic charges is generated by continuous vibration and is made to fly between deflecting electrodes forming a uniform electric field therebetween to obtain a recording on a recording member.

More specifically, in this process, a charging electrode which receives recording signals is provided in front of, and at a certain distance from, the orifice of a nozzle constituting a part of a recording head equipped with a piezo vibrating element, and a pressurized liquid is supplied into the nozzle, while an electric signal of a determined frequency is applied to said piezo vibrating element to cause mechanical vibration thereof, thereby causing the orifice to emit a flow of liquid droplets. As the emitted liquid is charged by electrostatic induction by the abovementioned charging electrode, each droplet becomes provided with a charge corresponding to the recording signal. The droplets having such controlled charges are subjected to deflection corresponding to the amount of the charges during their flight through a uniform electric field between the deflecting electrodes so that only those carrying recording signals may be deposited onto the recording member.

Even this type of recording head has the essentially same defects as those in the recording head of the first-mentioned type.

Still another type of the recording head is such that liquid is discharged by mechanical vibrations to spatter it in the form of droplets. This is a "on-demand" type recording head. In this type of recording head, a volume of the liquid chamber, into which the liquid is supplied, is varied in accordance with a signal by mechanical vibrations of a piezo vibrating element, whereby the liquid is discharged in the form of droplets. Concrete construction of such recording head is disclosed in U.S. Pat. No. 3,747,120, IEEE Transaction on Industrial Applications, Vol. IA-13, No. 1, January/February, 1977, and other publications.

While such recording head is extremely simple in the construction of the system as a whole, it is not perfectly free from difficulties and problems in its construction and performances. That is, since the droplets are generated by mechanical vibrations of the piezo vibrating element, response in its high speed recording is problematical; various working problems exist in the formation of the liquid chamber, installation of the piezo vibrating element; and others; and, since miniaturization of the recording head is difficult, high density multi-orifice arrangement of the recording head with an orifice density of one or more orifices per pitch is extremely difficult, hence difficulty in the high speed recording.

As such, most of the conventional recording heads have various points of problem yet to be solved in respect of their construction, working, high speed recording, high density multi-orifice arrangement, and further the construction of the system as a whole.

SUMMARY OF THE INVENTION

In order to solve such various problems, the present inventors have already proposed in their co-pending U.S. application Ser. Nos. 262,604 and 262,605 (both filed May 11, 1981) which is a continuation and a division, respectively, of U.S. application Ser. No. 948,236 (filed Oct. 3, 1978, now abandoned) an improved recording method and a recording device. The present invention is a further improvement in this recording device.

It is therefore an object of the present invention to provide a liquid jet recording device which is excellent in its liquid discharge efficiency, discharge response, discharge stability, and continuous recording capability over a long period of hours.

It is another object of the present invention to provide a liquid jet recording device capable of performing a high speed recording.

It is still another object of the present invention to provide a liquid jet recording device which is easy to manufacture, and in which extremely practical high density multi-orifice arrangement of the recording head is realized.

According to the present invention, there is provided a liquid jet recording device which comprises: a recording head having liquid discharging orifice for discharging liquid in a predetermined direction, a heat generating member, a heat acting zone where heat energy generated from the heat generating member acts on the liquid, and liquid feeding path for feeding the liquid to the heat acting zone; and drive signal feeding means for generating drive signals to drive said heat generating member to discharge the liquid in the predetermined direction, wherein the direction of the liquid flowing into said heat acting zone from said liquid feeding path differs from the direction of the liquid flowing out of said heat acting zone toward liquid discharging orifice.

DETAILED DESCRIPTION OF THE PREFERRED EMBODIMENTS

The recording device according to the present invention can be effectively utilized for discharging and spattering liquid in the form of droplets by heat energy, and has extremely favorable liquid discharge efficiency, discharge response, and continuous recordability over a long period of hours. The multi-orifice arrangement of the recording head is not only substantially perfectly free from mutual influence among the droplets discharged from each orifice, hence excellent in the discharge stability, but also is extremely simple in construction, hence delicate working can be done easily. On account of this, the recording head itself can be reduced in size far smaller than that of the conventional recording head. In addition to these, it has various remarkable advantages such that the high density multi-orifice arrangement indispensable for the high speed recording can be very easily realized due to its simple construction and easiness in its working, that removal of the electrodes for driving the heat generating body can be done extremely easily, and that the array construction of the discharge orifice of the recording head can be arbitrarily designed depending on one's desired at the time of the multi-orifice arrangement of the recording head, hence it can be done very easily to construct the recording head in the form of a bar (or full-line construction).

Figure 1A:
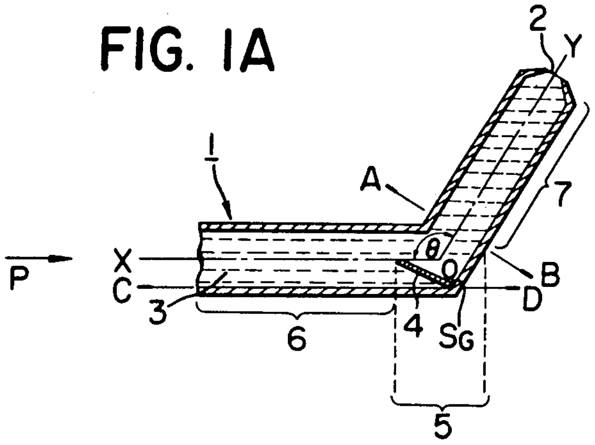
FIGS. 1A, 1B, and 1C are respectively schematic diagrams showing the principle of the recording head of the recording device according to the present invention.

Referring now to FIG. 1A showing the principle of the recording device according to the present invention, liquid 3 is being supplied to a recording head 1 through various means such as external liquid feeding tank (not shown), a liquid feeding tube (not shown), and a filter (not shown). In this instance, the liquid is subjected by a pump and other appropriate pressure applying means to a pressure P which by itself is not high enough to discharge the liquid from a discharge orifice 2.

As shown in the drawing, a heat generating body 4 which is an expedient to generate heat energy is positioned in a heat acting zone 5 where the generated heat energy acts on the liquid 3. The heat acting zone 5 is a space, wherein at least the heat energy which the heat generating body 4 has generated is applied to the liquid 3, and the liquid in this heat acting zone 5 brings about changes in its state (liquid volume expansion or generation of foams) effective to discharge the droplets.

As is apparent from FIG. 1, the fundamental characteristic of the present invention resides in that the direction of the liquid 3 flowing into the heat acting zone 5 through the liquid feeding path and the direction of the liquid flowing out of the heat acting zone 5 toward the liquid discharge orifice 2 are mutually different by bending the liquid flowing path, and that the substantially planar heat generating surface $S_G$ of the heat generating body 4 is directed to the liquid discharge orifice. Owing to such characteristic, the expected object of the present invention can be effectively attained.

The heat acting zone 5, the liquid feeding path 6 and the liquid discharge orifice 2 are so arranged that they may constitute an angle $\theta$. In more detail, a center axis X0 at a portion in the vicinity of the heat acting zone 5 in the liquid feeding path 6 (the axis X0 being in parallel with the direction of the liquid flowing into the heat acting zone 5 from the liquid feeding path 6) forms a certain angle $\theta$ with respect to an axis Y0 which is parallel with the direction of the liquid flowing out of the heat acting zone 5 to the liquid discharge orifice 2 (the axis Y0 being such one, as shown in the drawing, that has been obtained by rotating rightward the line component X0 for an angle $\theta$ with a point 0 as the center).

With respect to the axis Y0, it may be the center axis in the vicinity of the heat acting zone in the liquid discharge path 7.

The heat generating body 4 which supplies heat energy to the liquid in the heat acting zone 5 should desirably be disposed at the heat acting zone 5 in such a manner that the heat generating surface thereof may be substantially directed toward the liquid discharge orifice 2. In particular, it is desirable that the heat generating surface of the heat generating body 4 be positioned substantially in parallel with a cross-sectional plane A-B of the liquid path at the heat acting zone 5 to the side of the discharge orifice 2, and that the heat generating body 4 be disposed at the heat acting zone 5 so that it may be substantially perpendicular to the center axis (in the drawing, it is identical with the axis Y0 of the discharge orifice 2).

Figure 1B:
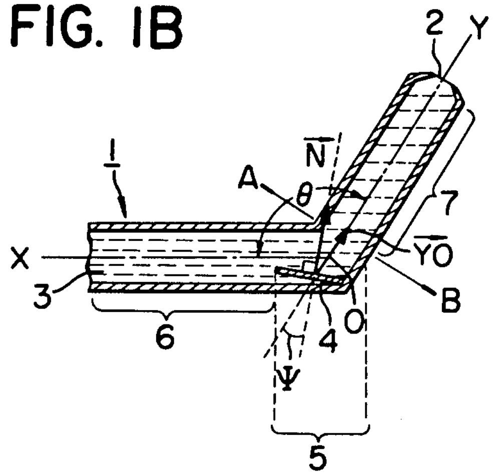

It goes without saying that the abovementioned angle $\theta$ and facing direction of the surface of the heat generating body may take various values other than the angle as shown in the drawing in designing the recording head. However, if the angle $\theta$ is very close to 0° or 180°, not only formation of the heat generating body, the heat acting zone, the liquid feeding path, and the discharge orifice becomes difficult, but also the intended object of the present invention becomes difficult to be achieved effectively. It is therefore desirable that the angle $\theta$ may usually take a value of $30° \leqq \theta \leqq 150°$, or more preferably $45° \leqq \theta 135°$, or optimumly $\theta$=substantially 90° (since the angle $\theta$ depends on precision in the manufacture of the recording head, it is generally designated 90°±10°). On the other hand, regarding the facing direction of the heat generating body, it is desirable that, as shown in FIG. 1B, an included angle $\Psi$ formed by a vector $\vec{Y0}$ on the axis Y0 and a normal vector $\vec{N}$ of the heat generating surface erected on a point where the axis Y0 (or its extension) intersects with the heat generating surface of the heat generating body 4 be so selected that it may be 45° or smaller in a usual case, or more preferably 30° or smaller, or more particularly substantially 0° (since the angle depends on precision in the manufacture of the recording head, it is generally 5° or smaller). In particular, when $\theta$=90° and $\Psi$=0°, the most preferred result can be obtained in the formation of the heat generating body, the heat acting zone, the liquid feeding path, and the liquid discharge orifice becomes practically easy.

Now, when a signal is applied from outside to the heat generation body, the heat generating body instantaneously generates heat to cause the heat energy to act on the liquid within the heat acting zone 5. As the result, there takes place a change in the state of the liquid (expansion of liquid volume or generation of foams), whereby a predetermined quantity of the liquid is discharged from the discharge orifice 2 in a predetermined direction.

Thus, according to the present invention, the liquid discharge efficiency, the discharge stability, and so on are improve when a bent portion is formed in a portion of the liquid flowing path where the heat acting zone is situated, and the heat generating surface of the heat generating body which is provided for causing the heat energy generated to be effectively acted on the liquid at the heat acting zone is positioned in confrontation to the liquid discharge orifice. Various reasons can be considered for these causes: (1) abrupt change in pressure is effectively transmitted in the liquid discharging direction, whereby the effect of transmission of the pressure change (the so-called "back-pressure effect") based on the change in the state of the liquid within the heat acting zone without contributing to the discharge of the droplets is suppressed with respect to the direction in the liquid feeding path; and (2), when the multi-orifice arrangement is realized, a phenomenon of the mutual interference of the liquid between the adjacent heat acting zone due to introduction of the back-pressure into the common liquid chamber can be suppressed with the consequent improvement in the liquid discharge stability. Further, since the heat energy can be efficiently utilized for the liquid discharge, the drive energy of the heat generating body can be reduced, which brings about favorable consequences of energy saving, continued recordability over a long period of hours, improvement in durability of the heat generating element, and others.

Figure 1C:
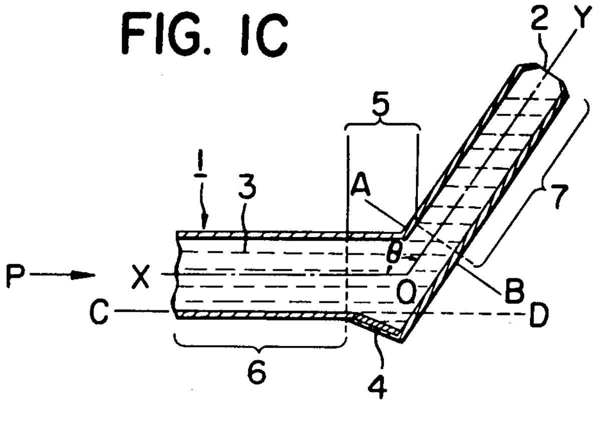

With a view to improving the liquid discharge efficiency, the liquid discharge response, and so on, at least a part of the heat generating surface of the heat generating body may be provided below a reference axis at a portion adjacent to the heat acting zone in the liquid feeding path, as shown in FIG. 1C.

In the drawing, the line segment C-D designates an axis showing a reference plane formed by a portion of the liquid feeding path 6 adjacent the heat acting zone 5. The heat generating body 4 is so positioned that at least a part of the heat generating surface $S_b$ may exist at a portion lower than the reference axis C-D. In so doing, a pressure component out of the abrupt pressure changes occurs at the heat acting zone, which propagates in the direction of the liquid feeding path (without contributing to the droplets discharge), is considered to be substantially reduced.

Figure 2A:
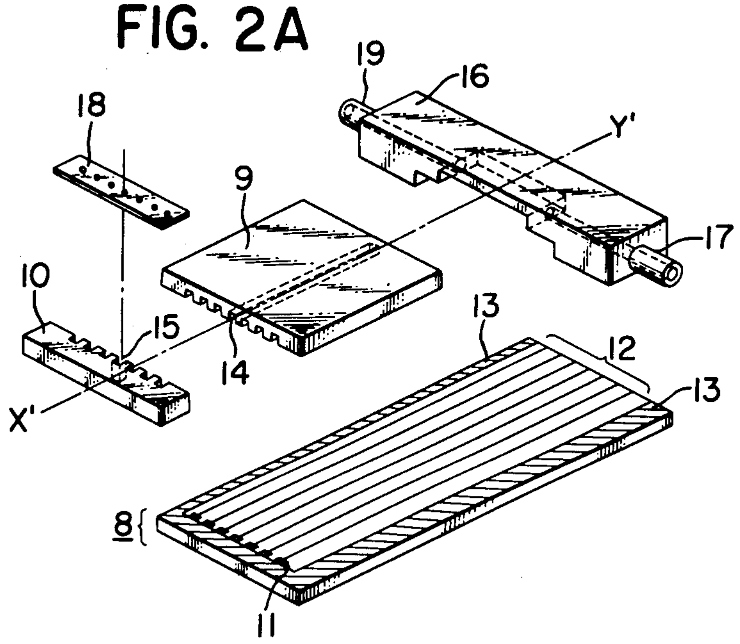
FIGS. 2A, 2B, and 2C are respectively an exploded view and side elevational views for explaining the basic construction of the recording head of the recording device according to the present invention.

In the actual manufacture of the recording device according to the present invention, a particularly preferred result in designing can be attained by constructing it with a plurality of blocks for base plate having the heat generating body, liquid feeding path plate, liquid discharge path plate, and so on, as shown in FIG. 2A. In other words, the construction is such that the direction of the liquid discharge path deviates from the base plate surface having the heat generating body, whereby the heat generating body can be provided at a position off the liquid discharge orifice. Accordingly, an electrode pattern for applying a signal to the heat generating body can be formed arbitrarily, and removal of the electrodes becomes easy, and various other advantages can be obtained. For instance, the recording head can be constructed as shown in FIG. 2A, with at least, the heat generating base plate 8 including a heat generating body 11, power conducting means to apply electrical signals to the heat generating body (in the drawing, it is shown to have a plurality of selective electrodes 12 and a common electrode 13), and so on, a liquid feeding path plate (or block) 9 to form a flowing path for feeding the liquid, a liquid discharge path plate (or block) 10 for forming a flowing path for the liquid discharge, and others. The drawing illustrates the recording device, in which the multi-orifice arrangement of the recording head which is the very characteristic of the present invention has been realized. The base material for the heat generating base plate is generally selected from glass, alumina, or ceramics. The material for the heat generating body is selected from those resistive materials such as $ZrB_2$, $HfB_2$, $TiB_2$, $TaB_2$, $NbB_2$, and others. For the plates or block for the liquid feeding path and liquid discharging path, etc., there may be used glass, ceramics, and, depending on circumstances, various plastics having heat resistant property.

Figure 2B:
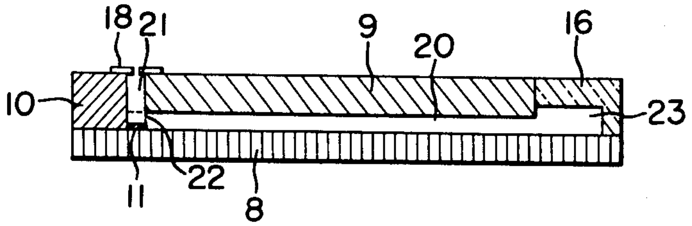

In more detail, a plurality of fine grooves 14 are formed in the liquid feeding path plate 9 at positions corresponding to each of a plurality of heat generating bodies 11. In the same manner, a plurality of fine grooves 15 are formed in the liquid discharge path plate 10 at positions corresponding to the abovementioned fine grooves 14 in the liquid feeding path plate 9. When these blocks are integrally combined, there is formed the device, the cross-section of which is as shown in FIG. 2B. In other words, the liquid feeding path 20 is formed by the surface of the heat generating base plate 8 and the grooves of the liquid feeding path plate 9, while the liquid discharging path 21 is formed by the end surface of the liquid feeding path plate 9 and the grooves in the liquid discharging path plate 10. The drawing illustrates the example, wherein the angles $\theta$ and $\Psi$ are set at 90° and 0°, respectively. Between the liquid feeding path 20 and the liquid discharging path 21, there is formed the heat acting zone 22 as shown with a broken line, and a heat generating body 11 is so disposed that it may cause the heat energy to effectively act on the liquid existing in the heat acting zone 22. In the liquid feeding path plate 9, there is provided means for feeding the liquid from outside into the liquid feeding path 20, e.g., a block 16 to form the feeding liquid chamber 23, as the case may be. In this block 16, there is provided a pipe 17 for introducing the liquid from an external tank into the feeding liquid chamber 23. A reference numeral 18 designates a discharge orifice plate (in the illustration, holes for the discharge orifice are formed in correspondence to the fine grooves 15). A reference numeral 19 designates an air vent pipe.

Figure 2C:
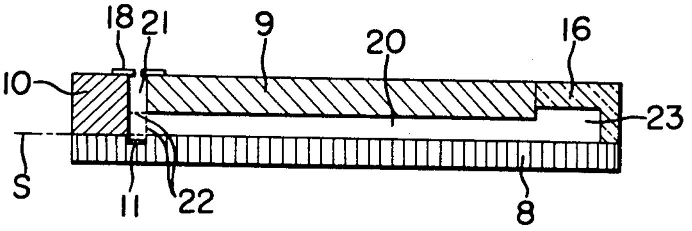

FIG. 2C illustrates an embodiment, wherein a part of the heat generating surface of the heat generating body 11 is situated at a position lower than the reference axis S at a portion adjacent the heat acting zone 22 in the liquid feeding path 20. In case the recording head is constructed with a plurality of blocks as mentioned above, positioning of the heat generating body lower than the reference axis S can be done relatively easily by forming a recess at a position on the heat generating base plate where the heat generating body is placed.

Figure 3:
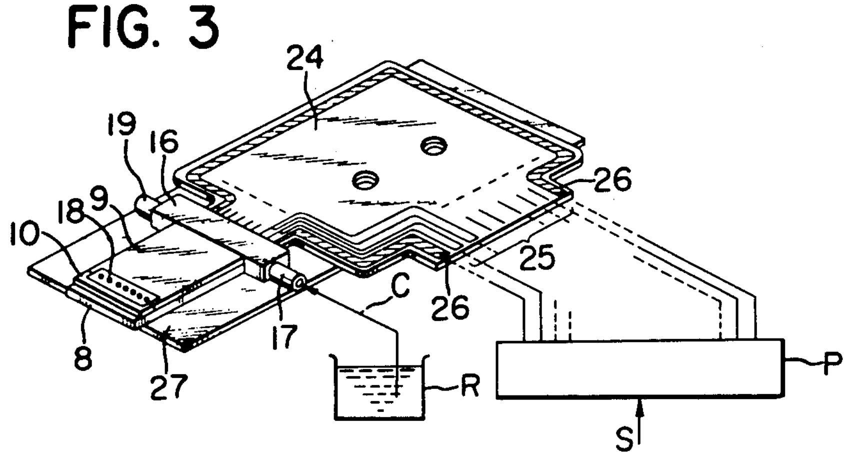
FIG. 3 is a schematic perspective view showing the overall system of the recording device according to the present invention.

FIG. 3 is a schematic perspective view showing the overall system of the recording device having the recording head according to the present invention as explained with reference to FIGS. 2A to 2C. In the illustration, a reference numeral 24 designates an electrode lead base plate (not shown in FIGS. 2A to 2C), on which lead wires 25, 26 for the selective electrodes and the common electrode are provided. A heat sink 27 is provided on the lower surface of the heat generating base plate 8 depending on necessity. The lead wires 25 for the selective electrodes and the lead wire 26 for the common electrode are electrically connected with drive signal generating means for feeding driving signals such as pulse voltage, etc. to each of the heat generating bodies to thereby drive each of a plurality of heat generating bodies 11. The drive signal generating means P is so designed that a signal S for an information to be recorded may be introduced as an input. When the signal S is input into the drive signal generating means, a drive signal output is produced from this drive signal generating means P, whereby any heat generating body selected on the basis of the drive signal is actuated to selectively discharge the liquid from the discharge orifice, and the information recording is performed.

The end part of the pipe 17 may be extended, or connected with other introduction pipe C, provided that it is communicated with the liquid L in the reservoir R where the liquid L is stored. Accordingly, the liquid as discharged from each of the discharge orifices is supplied to each of the heat acting zones through the pipe 17.

Figure 4A:
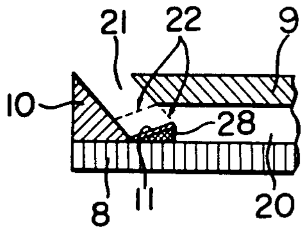
FIGS. 4A, 4B, 4C, 4D, 4E and 4F respectively illustrate different embodiments of the recording head according to the present invention.
Figure 4B:
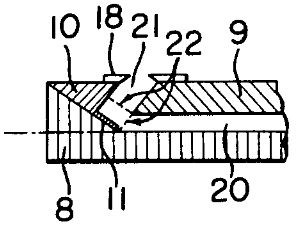
Figure 4C:
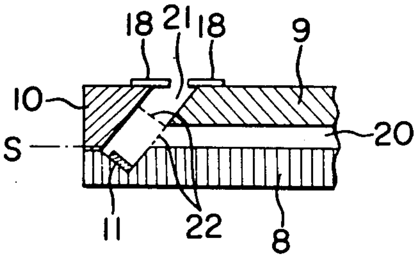
Figure 4D:
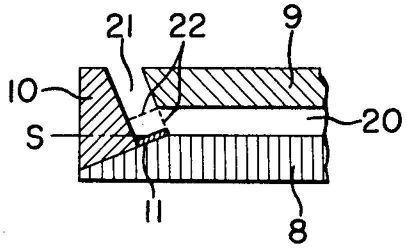

In the above-described embodiment, explanations have been made as to the construction, wherein the end surface of the liquid feeding path plate 9 is disposed at substantially 90° angle with respect to the reference axis C-D of the feeding path, and the angles $\theta$ and $\Psi$ are respectively made 90° and 0°. It is, however, possible that these angles $\theta$ and $\Psi$ be varied as shown in FIGS 4A and 4B, or at least a part of the heat generating surface of the heat generating body be positioned below the reference line S in the abovementioned liquid feeding path, while varying the angles $\theta$ and $\Psi$, as shown in FIGS. 4C and 4D. In FIG. 4A, a reference numeral 28 designates a member for adjusting the positioning angle $\Psi$ of the heat generating body 11.

Figure 4E:
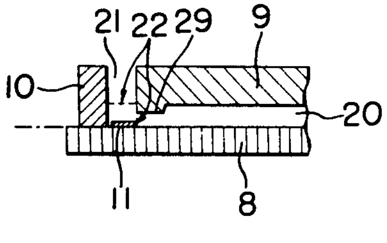
Figure 4F:
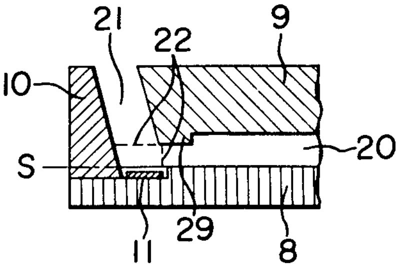

Further, when a protruded part 29 is provided in the vicinity of the heat acting zone 22 of the liquid feeding path plate 9, as shown in FIG. 4E or 4F, with a view to minimizing the pressure loss (back pressure) into the liquid feeding paath, more favorable results can be obtained in respect of the liquid discharge efficiency.

In the abovementioned embodiments shown in FIGS. 2A to 2C, explanations have been given as to a construction, wherein the grooves 14 constituting the liquid feeding path 20 are formed at the side of the liquid feeding path plate 9, while the grooves 15 constituting the liquid discharge path 21 are formed at the side of the liquid discharge path plate 10. In this instance, it may be feasible that the grooves 14 be formed in the heat generating base plate 8 and the grooves 15 be formed in the end surface at the side of the liquid feeding path plate 9. Furthermore, if possible, both the liquid feeding path plate 9 and the liquid discharge path plate 10 are made of the identical material, in which the liquid feeding path and the liquid discharge path may be formed by the use of working techniques such as etching, electron beam working, or laser beam working.

Owing to its essential characteristics, the recording device according to the present invention can be appropriately used for multi-color recording with multi-color liquids. As already mentioned in the foregoing, the present invention makes it possible to form, in desired configurations, the liquid discharge orifice, in which a plurality of orifices are arranged with a very high density per pitch, the heat generating body, and signal applying means to apply signals to the heat generating body in a desired configuration. Also, the present invention makes it possible to construct the recording device in a very compact structure for discharging multi-color liquids.

When the conventional recording head is used, the recording heads for the multi-color liquids cannot be arranged with high density, so that it is necessary to lag the driving timing in accordance with sequence of arrangement of the recording heads with respect to the recording paper, in consequence of which there accrue various disadvantages such that signal control (particularly at the time of high speed operation) is difficult, color discrepancy occurs in high probability, and others.

Generally speaking, in a multi-color image constituted with a plurality of dots, reproducibility of an intermediate tone lowers, or color discrepancy becomes prohibitive, when the positional displacement of the dots exceeds 150 to 170 microns or so. According to the liquid ejecting device of the present invention, the discharge orifice may be arranged at a density of 10 orifices per millimeter or above, within which range of critical values the discharge orifice can be formed with the consequence that extremely favorable result can be obtained in respect of reproducibility of the intermediate tone, etc.

Figure 5A:
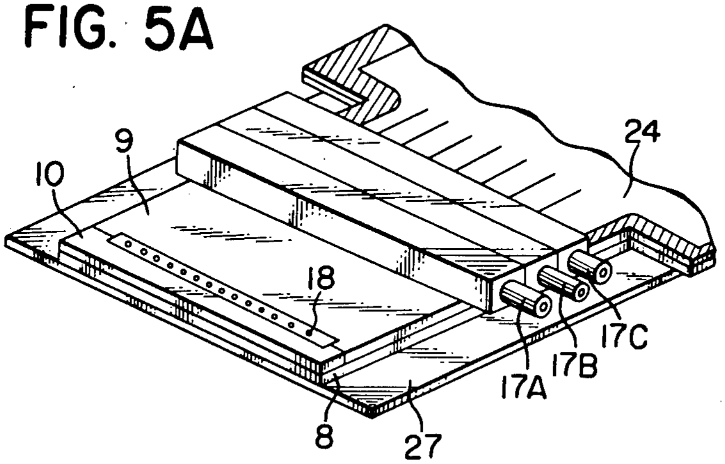
FIGS. 5A and 5B are respectively perspective view and an exploded view of the main part of the recording head according to the present invention, when the recording device is made adaptable for color recording.
Figure 5B:
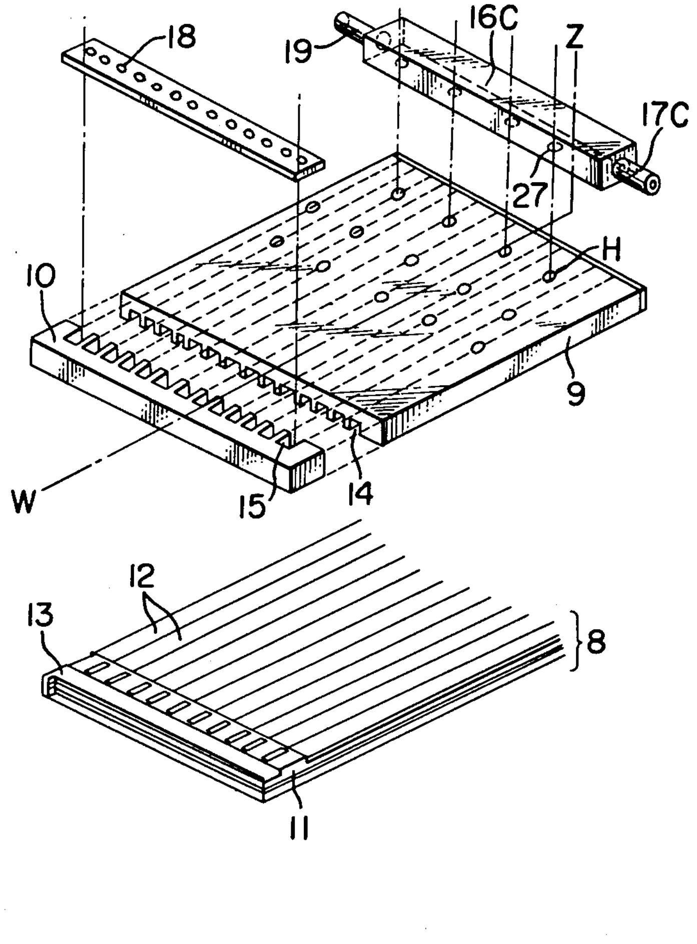

FIG. 5A shows a part of a color recording device. That is, in adapting the device for color recording, the construction is essentially the same as that shown in FIGS. 2A to 2C with the exception that blocks 16A, 16B and 16C forming the liquid feeding chambers for each of the multi-color liquids (e.g., A, B and C) and liquid feeding pipes 17A, 17B and 17C are provided. As shown in FIG. 5B, a plurality of holes H are formed in the grooves 14 for the liquid feeding path in the liquid feeding path plate 9 at every two grooves so that one and same color liquid may be fed therethrough (in the illustrated embodiment, color liquid C is exemplified). Selection of the color tone and kind of the multi-color liquid is properly done depending on the kind of recording operation such as, for example, graphic recording (the so-called "false color" recording), natural color recording (the so-called "true color" recording), or, as a special example, recording of document written in two colors such as black and red, or of corrected draft, and so on.

Although not shown in the drawing, there may also be provided an appropriate photo-detecting means (filter, light receiving element, etc.) for obtaining multi-color information as input for the system of the recording device.

It is sufficient that density of the liquid discharge orifice and the image resolving density of the light receiving element in the photo-detecting means be mutually correspondent in respect of a single image element formed from a plurality of dots. For instance, when the natural color recording is performed with liquids in three primary colors, the image resolving density of the light receiving element may be 4 per millimeter, if the discharge orifice density is 10 per millimeter.

In the FIG. 5 embodiment, an example of providing a plurality of blocks 16A, 16B and 16C on the liquid feeding path plate has been shown. It should however be noted that the method for feeding liquid to the recording head is not limited to such method alone, but various methods may be adopted for such purpose.

In order to enable those persons skilled in the art to put this invention into practice, the following preferred examples are presented.

EXAMPLE 1

The recording head for the device shown in FIG. 3 was fabricated in the following manner.

A multitude of grooves, each having a width of 60 μm, a depth of 60 μm and a pitch of 260 μm, were formed by means of a micro-cutter on a glass plate having a dimension of, for example, 5 mm in width, 10 mm in length and 0.8 mm in thickness in the direction along the width of the glass plate, thereby forming the liquid feeding path plate 9 as shown in FIG. 2A. In the same manner, a multitude of grooves, each having a width of 70 μm, a depth of 80 μm, and a pitch of 250 μm, were formed on the glass plate of the same dimension as above, thereby obtaining the liquid discharge path plate 10.

The heat generating base plate 8 is basically constructed with a base layer 29 having temperature maintenance and surface smoothness properties, a heat generating body 11, electrodes 12, 13 and an insulative protective layer 30. $SiO_2$ as the base layer was sputtered on an $Al_2O_3$ substrate of 0.6 mm in thickness to a thickness of 3 microns, followed by sequential lamination of $ZrB_2$ to a thickness of 800 angstroms, and aluminum as the electrodes to a thickness of 5,000 angstroms. Thereafter, the heat generating body 11 having a width of 65 μm and a length of 75 μm was formed with a pitch of 250 μm by means of selective photo-etching. Subsequenty, $SiO_2$ was sputtered to a thickness of 1 μm to form the insulating protective film, after which the heat sink 27 was provided on the back side of the substrate to complete the heat generating base plate 8.

Figure 6:
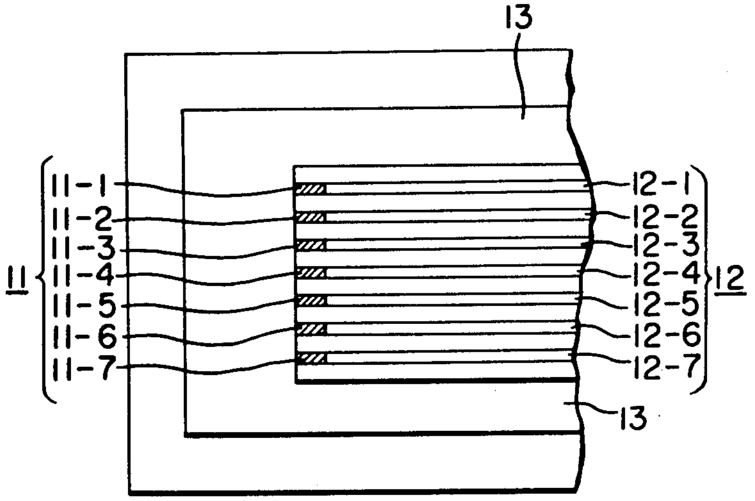
FIG. 6 is a plane view showing the heat generating base plate.

FIG. 6 illustrates a plane view of the heat generating base plate 8 thus obtained. In this drawing, reference numerals 11-1 to 11-7 designate a plurality of heat generating bodies, 12-1 to 12-7 the selective electrodes, and 13 a common electrode. (In this embodiment, seven heat generating bodies and seven selective electrodes are provided.) The selective electrodes 12-1 to 12-7 and the common electrode 13 extend to one end of the heat generating base plate 8, and are electrically connected with the drive signal feeding means P. Holes, each having a diameter of 60 μm, were perforated by the electron beam working with a pitch of 250 μm in a molybdenum member having a thickness of 100 μm to obtain the liquid discharge orifice plate 18. It should be understood that this liquid discharge orifice plate 18 is not always required to be provided, if the discharge path has a desired shape and the droplets can be stably discharged therethrough. Further, the block 16 for introducing the liquid fed from an external liquid feeding tank into the liquid feeding path, a liquid feeding pipe 17, and an air vent pipe 19 were also fabricated.

Figure 7:
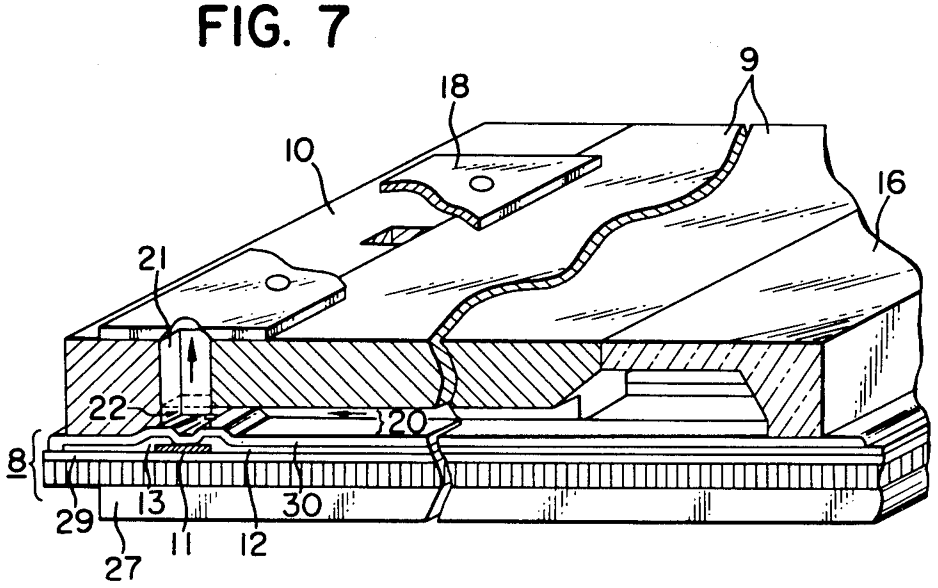
FIG. 7 is a perspective view of a part of the recording head of the recording device according to the present invention.

The abovementioned liquid feeding path plate 9, the liquid discharge path plate 10, the heat generating base plate 8, the liquid discharge orifice plate 18, and the block 16 were integrally combined to form the recording device as shown in FIG. 3. FIG. 7 shows a part of the recording head in this recording device.

Using the recording head of the abovementioned construction and a recording liquid of the undermentioned composition, the droplets discharge tests were conducted.

The recording conditions are as follows:
Signal Voltage—15 V,
Frequency—1.5 KHz,
Pulse Width—20 μsec.

The recording operation was continued over 40 hours. The result revealed that the stability in the droplets discharge did not change at all, and favorable recording could be done without occurrence of mis-dots. Favorable results could also be obtained with a frequency of 5 KHz.

Compostion of Liquid (I)
Water—68 gr.
Ethylene Glygol—30 gr.
Direct Fast Black—2 gr.
(II)
Toluene—70 gr.
Ethylene Glycol—28 gr.
Oil Black HBB—2 gr.

EXAMPLE 2

In the same manner of fabrication as mentioned in Example 1 above, various recording heads were manufactured, in which the angle θ and the angle Ψ formed by the normal line erected on the heat generating surface and the reference line in the liquid discharge direction in FIG. 1 were varied as in Table 1 below.

TABLE 1

| | Comparative Example | Example 2 | |
|---|---|---|---|
| θ | 180° | 135° | 90° |
| ψ | 90° | 45° | 0° |
| A | 100 μsec. | 77 μsec. | 61 μsec. |
| B | 15 V | 12 V | 11 V |

The recording operations were also done in the same manner as in Example 1 above. The drive voltage, the pulse width, and the frequency for the recording operations are also shown in Table 1 above. In the above Table 1, the column "A" indicates a pulse width for stable droplets discharge when a signal having a driving voltage of 15 V and a frequency of 2 KHz is applied, and the column "B" indicates the minimum drive voltage for the droplets discharge, when a signal having a pulse width of 100 μsec. and a frequency of 2 KHz is applied.

Favorable results could be obtained in respect of the liquid discharge efficiency, when the discharge direction and the feeding direction of the liquid were bent as in the recording device of the present invention.

EXAMPLE 3

In the substantially same method as in Example 1 above, a full-time multi-orifice recording head having the discharge orifice provided at a density of 1,728 pieces per 125 μm pitch was fabricated. The recording operations were conducted on a recording paper in A4 size under the following recording conditions: drive voltage = 15 V; pulse width = 20 82 sec.; frequency = 1.2 KHz; and moving speed of recording paper = 10 cm/sec. The time required for the recording was approximately 3 seconds—a very high recording speed.

EXAMPLE 4

The recording device of the type as shown in FIG. 5A was fabricated in the undermentioned manner.

$SiO_2$ as a heat regenerating layer 21 was sputtered to a thickness of 3 microns onto an $Al_2O_3$ substrate of 0.6 mm in thickness followed by sequential lamination of $ZrB_2$ as a heat generating resistive body to a thickness of 800 angstroms, and aluminum as the electrodes to a thickness of 5,000 angstroms. Thereafter, 1,000 pieces of the heat generating resistive bodies, each having a width of 50 microns and a length of 300 microns, were formed thereon with a pitch of 111 microns by means of the selective photo-etching. Subsequently, $SiO_2$ was sputtered to a thickness of 1 micron to form an insulating protective layer, thereby completing the electro-thermal conversion section.

Next, a grooved plate, in which a multitude of grooves, each having a width of 60 microns, a depth of 60 microns and a pitch of 111 microns (i.e., the discharge orifice density of 9 per millimeter), were formed on a glass plate by means of a micro-cutter, and liquid feeding blocks 16A, 16B and 16C made of glass were adhered onto the substrate 8 where the electro-thermal conversion section had been provided. Subsequently, the heat sink 27 made of aluminum was adhesively provided on the opposite side of the substrate 8.

In this embodiment, since the discharge orifice is sufficiently small, no particular measures were taken such that the discharge orifice plate is provided at the tip end of the orifice thus formed so as to form therein the orifice of a desired diameter.

The recording head fabricated in the abovementioned manner (the discharge orifice density of 9 per millimeter, and the total orifice number of 1,000) was combined with a control circuit, photo-etching means, and so forth, and then the assembly was subjected to the recording operation by application of pulsive voltage to the 1,000 electro-thermal conversion members in accordance with image signals, while feeding the liquid under such a pressure that it does not discharge the liquid from the discharge orifice 18 before the heat generating resistive body generates heat. As the result, there could be obtained a color image having excellent image resolution and intermediate tone. The recording speed was also found very high.

The recording conditions are as shown in Table 2 below.

| | | |
|---|---|---|
| Yellow | Suminol Milling Yellow G (product of Sumitomo Chemical Co., Ltd.) | 2.0 gr. |
| | Water | 80.0 gr. |
| | Ethylene glycol | 18.0 gr. |
| Magenta | Suminol Levelling Brilliant Red (product of Sumitomo Chemical Co., Ltd.) | 1.0 gr. |
| | Water | 80.0 gr. |
| | Ethylene glycol | 19.0 gr. |
| Cyan | Suminol Milling Brilliant Sky Blue GW (product of Sumitomo Chemical Co., Ltd.) | 1.0 gr. |
| | Water | 80.0 gr. |
| | Ethylene glycol | 19.0 gr. |

For the recording liquid, the following compositions were also used with substantially same favorable result.

TABLE 2

| | | | |
|---|---|---|---|
| Drive Voltage | | 35 V | |
| Pulse Width | | 10 μsec. | |
| Repetitive Frequency | | 5 KHz | |
| Recording Member | | High quality paper (A-size 28.5 kg manufactured and sold by Hokuetsu Seishi K.K. under a tradename of "Seven Star") | |
| Liquid (Ink) | Yellow | Ospi Yellow RY (product of Orient Chemical Industries Ltd.) | 2.0 gr. |
| | | Ethanol | 80.0 gr. |
| | | Diethylene glycol | 18.0 gr. |
| | Magenta | Ospi Red BT (product of Orient Chemical Industries Ltd.) | 3.0 gr. |
| | | Ethanol | 80.0 gr. |
| | | Diethylene glycol | 17.0 gr. |
| | Cyan | Ospi Blue RL (product of Orient Chemical Industries Ltd.) | 2.0 gr. |
| | | Ethanol | 80.0 gr. |
| | | Diethylene glycol | 18.0 gr. |

EXAMPLE 5

The recording device, the cross-section of which is shown in FIG. 2C, was fabricated in the following manner.

In the same procedures as explained with reference to FIG. 2A, a multitude of grooves, each having a width of 60 μm, a depth of 60 μm, and a pitch of 250 μm, were formed on a glass plate by means of a micro-cutter, thereby obtaining the liquid feeding path plate 9. On the other hand, a multitude of grooves, each having a width of 70 μm, a depth of 80 μm, and a pitch of 250 μm, were formed in the same manner, and, further, a stage of 10 microns was formed by etching on the surface where it contacts the heat generating base plate, so as to be engaged with a recess in this heat generating part, thereby obtaining the discharge path plate 10.

The heat generating base plate 8 includes a base layer intended for temperature maintenance and surface smoothness, a heat generating body, electrodes, an insulating protective film, and so on.

A recess 30 of 10 $\mu$m in depth and 80 microns in width was formed in an $Al_2O_3$ substrate of 0.6 mm in thickness, on which $SiO_2$ as the base layer was sputtered to a thickness of 3 microns, followed by sequential lamination of $ZrB_2$ to a thickness of 800 angstroms and aluminum as the electrodes to a thickness of 5,000 angstroms. Thereafter, the heat generating body 11 of 65 $\mu$m in thickness and 75 $\mu$m in length was formed by the selective photo-etching with a pitch of 250 $\mu$m. Subsequently, $SiO_2$ was sputtered to a thickness of 1 $\mu$m to form an insulating protective film, after which a heat sink was provided on the rear surface of the substrate. Using this heat generating base plate, the recording device of the present invention was completed.

The recording operations were conducted in the same manner as in Example 1 above using the thus obtained recording device, and favorable results were obtained.

What we claim is:

1. A liquid jet recording device comprising:

(a) a liquid reservoir;

(b) means for defining a liquid flow path, said means having a feed portion and a discharge portion each formed along a separate center line, said portions being integrally and angularly interconnected such that the center lines intersect at an angle ($\theta$) within a range of $45 \leqq \theta \leqq 135$, said feed portion being connected to said liquid reservoir and said discharge portion having a discharge orifice on said discharge portion center line for discharging liquid in a predetermined direction different from the direction of liquid flow through said feed portion, wherein a heat acting zone is defined in said liquid flow path at the angular connection of said portions;

(c) a heat generating member provided in said feed portion and adjacent to said discharge portion for heating the liquid in said heat acting zone thereby changing its state and causing liquid to discharge from said discharge orifice in the predetermined direction, said heat generating member having a substantially planar heat generating surface defining a plane wherein the intersection of a normal to the plane and the center line of said discharge portion form an included angle $\Psi$ which is 5° or less; and (d) a drive signal feeding means for generating drive signals to drive said heat generating member.

2. The liquid jet recording device as set forth in claim 1, wherein at least a part of said heat generating member is provided below a reference axis within said feed portion and parallel to the center line thereof.

* * * * *

UNITED STATES PATENT AND TRADEMARK OFFICE

CERTIFICATE OF CORRECTION

PATENT NO. : 4,459,600
DATED : July 10, 1984
INVENTOR(S) : YASUSHI SATO

It is certified that error appears in the above-identified patent and that said Letters Patent is hereby corrected as shown below:

Column 6, line 9, "$S_b$" should read --$S_G$--; and line 31, "with at least," should read --with, at least,--.

Column 7, line 60, before "substantally" insert --a--.

Column 8, line 67, "Hare" should read --H are--.

Column 9, line 3, "Cis" should read --C is--.

Column 10, line 44, "Glygol" should read --Glycol--.

Column 11, line 17, "full-time" should read --full-line--;

line 22, "20 82 sec." should read --20 $\mu$ sec--; and line 61, "photo-etching should read --photo-detecting--.

UNITED STATES PATENT AND TRADEMARK OFFICE

CERTIFICATE OF CORRECTION

PATENT NO. : 4,459,600

DATED : July 10, 1984

INVENTOR(S) : YASUSHI SATO

It is certified that error appears in the above-identified patent and that said Letters Patent is hereby corrected as shown below:

Column 12, lines 6-49, Table 2 and the table there-following should be interchanged.

Signed and Sealed this

Tenth Day of December 1985

[SEAL]

Attest:

DONALD J. QUIGG

Attesting Officer

Commissioner of Patents and Trademarks